May 24, 1932.  J. L. WILSON  1,860,344
STABILITY METER FOR SHIPS AND OTHER MOVABLE BODIES
Original Filed June 23, 1926   3 Sheets-Sheet 1

Inventor
John Lyell Wilson
By his Attorney
W. Lee Helms

May 24, 1932.   J. L. WILSON   1,860,344
STABILITY METER FOR SHIPS AND OTHER MOVABLE BODIES
Original Filed June 23, 1926   3 Sheets-Sheet 2

Inventor
John Lyall Wilson
By his Attorney
M. Lee Sklar

Patented May 24, 1932

1,860,344

UNITED STATES PATENT OFFICE

JOHN LYELL WILSON, OF BROOKLYN, NEW YORK

STABILITY METER FOR SHIPS AND OTHER MOVABLE BODIES

Application filed June 23, 1926, Serial No. 117,957. Renewed March 9, 1932.

The object of the present invention is to provide a device for automatically measuring and indicating, continuously, the metacentric height of any floating vessel on which the instrument is installed.

Fundamentally the instrument is a gyroscope so suspended that the heeling moment of the floating vessel will be transmitted to the trunnions of the gyroscope and cause precession. The precessional velocity, which varies directly as the pressure on the trunnions and hence as the heeling moment, is measured and combined with the angle of heel so that the metacentric height will be indicated for a given displacement since it is a function of the relation between these two variables (angle and moment) at a given displacement.

The invention will be understood by reference to the accompanying drawings, in which—

Figure 1:
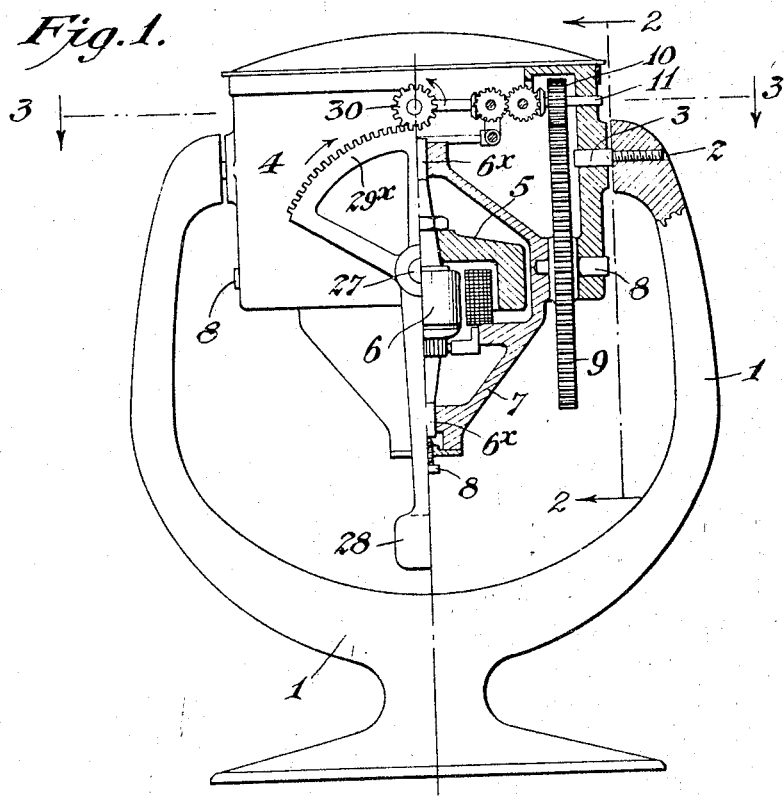
Figure 1 is a front elevation of an embodiment of the invention, part of the device being shown in section, as though cut on a vertical plane through the center of bearings 2 and 3.
Figure 2:
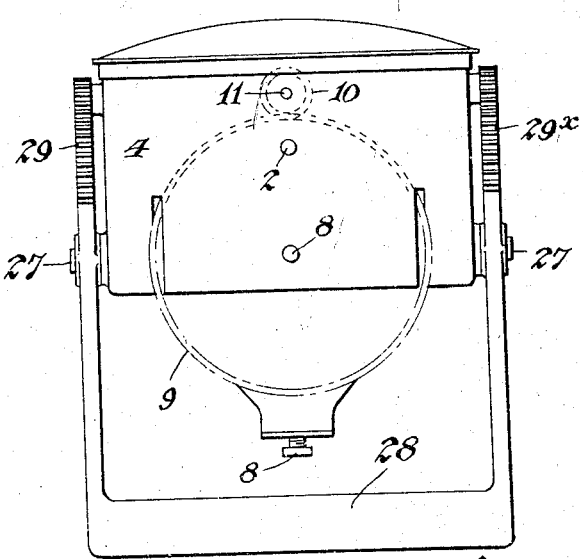
Figure 2 is a side elevation of the ring, gyro-frame and pendulum, looking in the direction of the arrows 2—2, Figure 1.

Referring to Figure 1 it will be seen that the operative parts of the device are carried by a pedestal or base member 1 formed as a yoke and provided with spaced bearing members 2 to receive coacting bearing members 3 on a ring-frame 4. The ring-frame is arranged to carry the entire mechanism of the device and it is so supported as to be unaffected by trim, pitching or other fore-and-aft motion of the vessel, being suspended on the said bearings which lie on an athwartship axis.

Ring-frame 4 carries a motor driven gyroscope of any suitable construction, the embodiment of the invention illustrated comprising a gyroscopic wheel 5 carried by the armature 6, the latter being provided with the bearing extensions 6ˣ suitably journalled in the gyroscopic frame 7, an adjustable thrust member 8 receiving the lower bearing-extension of the armature.

The gyroscope frame is movable upon the ring-frame 4, being mounted on opposed bearing members 8 which, like bearing members 2, 3, are disposed on an axis extending athwartship. Carried by gyroscopic frame 7 is a gear 9 which is in mesh with a pinion 10 on a shaft 11. Shaft 11 is also provided with a small bevelled gear 12 in mesh with a similar gear wheel 13 on a shaft 14. (See Fig. 3.) Shaft 14 carries a gear wheel 15 adapted to drive a gear wheel 16 on shaft 17. Shaft 17 has slidingly mounted thereon and splined thereto, a bevelled gear wheel 18 disposed intermediate the sleeves 19, 19ˣ of a bracket 20, the latter being a worm sleeve adapted to be driven by a worm shaft 21 by means of which the bracket and the gear are bodily moved lengthwise of both shafts 17 and 21.

The rotation of shaft 17 is, through gear wheel 18, adapted to drive a worm shaft 22, the shaft carrying a bevelled gear 23 in mesh with gear 18. One end of shaft 22 is journalled in sleeve 19ˣ of bracket 20 and the other end is journalled in a bearing member 24 rising from a worm sleeve 25 on a worm shaft 26, which shaft is parallel and co-operative with shaft 21 for a purpose hereinafter to be explained.

Figure 4:
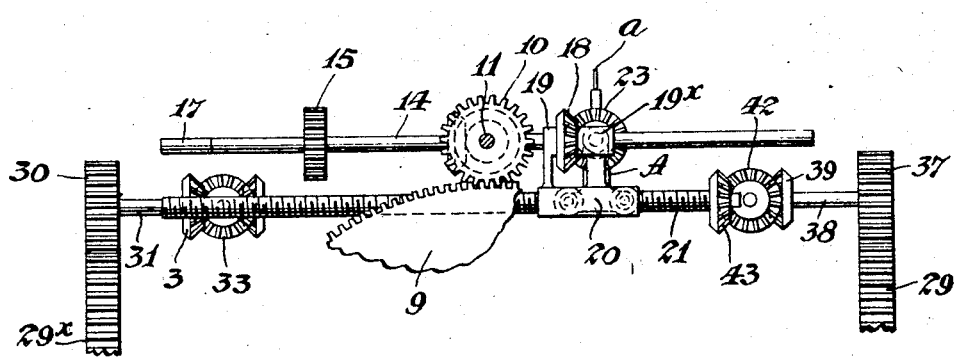
Figure 4 is an enlarged detail view, in elevation, illustrating the means for bodily moving the pointer carrying frame and for bodily moving the pointer on that frame.

Sleeves 20, 25 are connected by the parallel rods 26′, and slidably mounted on the rods are the bracket sleeves of a worm sleeve A carrying a pointer a, the pointer being shown in Figure 4. Sleeve A is mounted on shaft 22.

Figure 3:
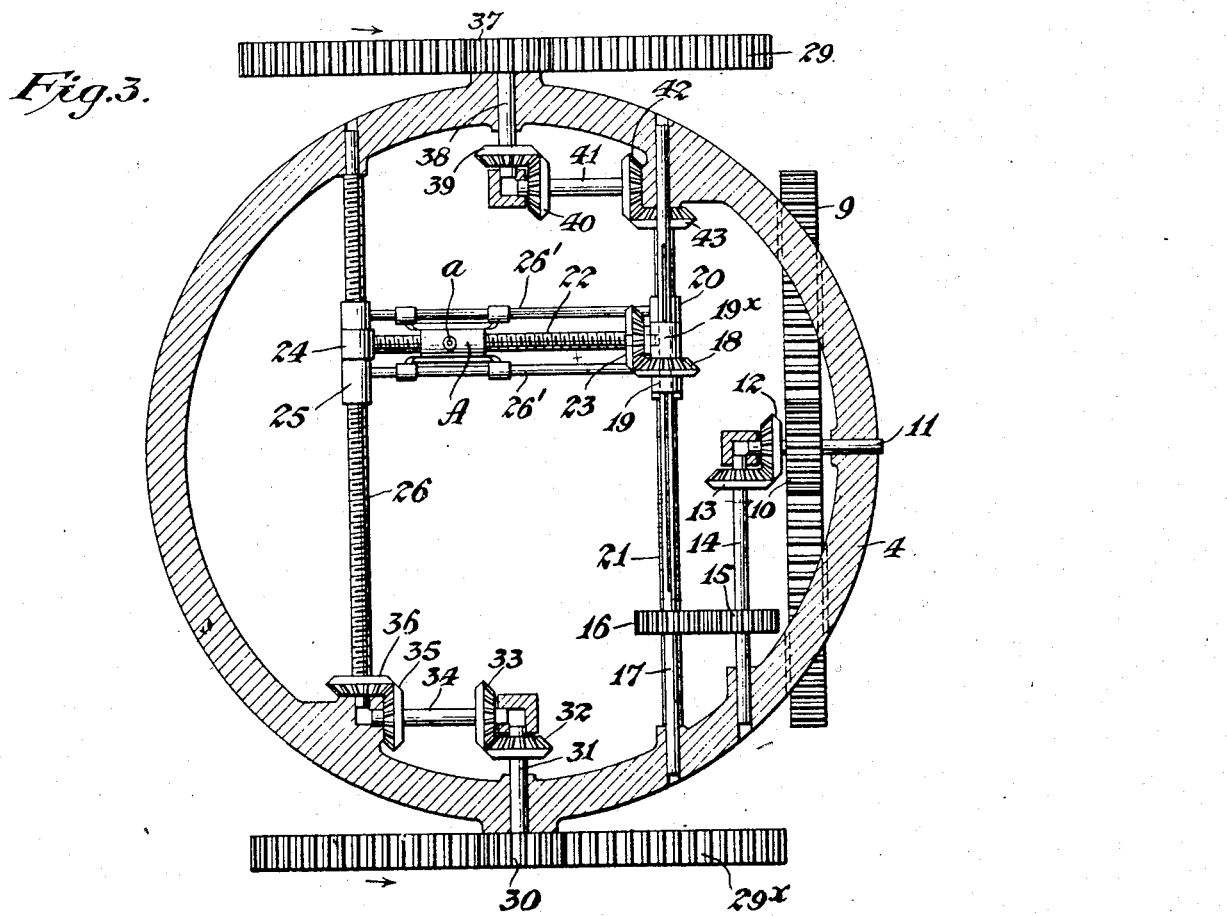
Figure 3 is a transverse section on the line 3—3, Figure 1, looking in the direction of the vertical arrows.

It will thus be seen that relative movements between gear wheel 9 on the gyroscopic frame 7 and pinion 10 on the ring-frame 4 will impart rotative movements to shaft 22 and will cause a movement of the pointer *a* to the left or to the right from its position illustrated in Figure 3. The mounting of the pointer-carrying parts upon the shafts 21, 26 will enable the simultaneous movement of the pointer in either direction transversely of those previously described.

The means for imparting rotation to the shafts 21, 26 will now be described.

Pivotally supported at 27 on the ring-frame 4 is a yoke pendulum 28, each arm of the pendulum-projecting above its pivot and being formed as a segmental rack, the racks being numbered 29, 29×. In mesh with segment rack 29× is a pinion 30 on a short shaft 31 journalled in ring-frame 4 and carrying a bevelled gear 32 in mesh with a similar gear 33 on a stub shaft 34, which shaft carries a bevelled gear 35 in mesh with a similar gear 36 on shaft 26. Segmental rack 29 is in mesh with a gear 37 on a short shaft 38 journalled in ring-frame 4 and carrying a bevelled gear 39 in mesh with a similar gear 40 carried by a stub shaft 41 on which a bevelled gear 42 is supported in mesh with a similar gear 43 on worm shaft 21.

Thus it will be seen that relative movements between the pendulum 28 and the ring frame 1 will cause, through the mechanism just described, a bodily movement of the pointer *a* toward and from the segment rack 29×.

When the ship is at rest, the armature shaft 6 of the gyroscope will be in a vertical line with respect to the plane of the base of pedestal 1. In exact proportion to the angular velocity of precession of the gyroscope frame, and in a direction at right angles to the precessional movement, movements of the pointer *a* will be effected, through the relative movements of gear wheel 9 and pinion 10, with their connected mechanism, as explained above. At the same time the pendulum 28, although suspended from the ring-frame 4, is entirely independent of the action of the gyroscope, and it indicates the angles of heel by moving the pointer back and forth in a direction transverse to that in which it is moved by the angular velocity of precession of the gyroscope frame.

Mounted immediately over the pointer *a* is a graduated dial 44, on the under side of which there is a slot in a diameter corresponding with the zero of the dial. In the present instance the slot is formed in a strip 44× on the underface of the dial and forming a member thereof. The dial is provided with rollers 45 adapted to run on a track-way 46 at the top of the ring-frame 4. The dial 44 is located beneath a glass plate 49 which has inscribed thereon a reference line 49′ (Fig. 5) which reference line, as shown, is coaxial with the slot in the strip 44× when the dial 44 is in its zero position.

Figure 5:
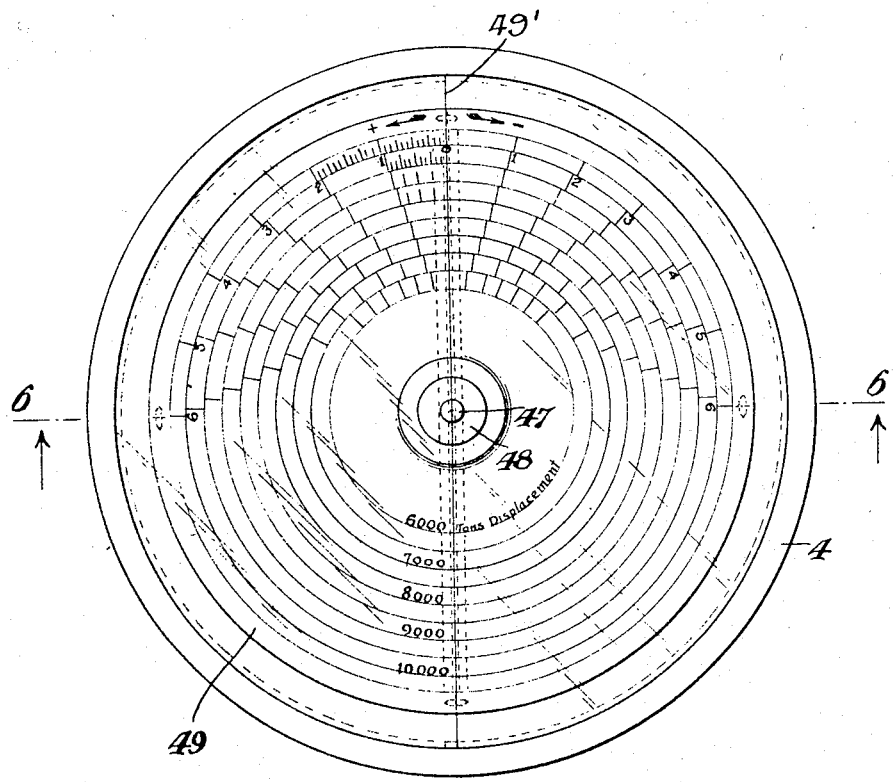
Figure 5 is a plan view of the graduated dial.
Figure 6:
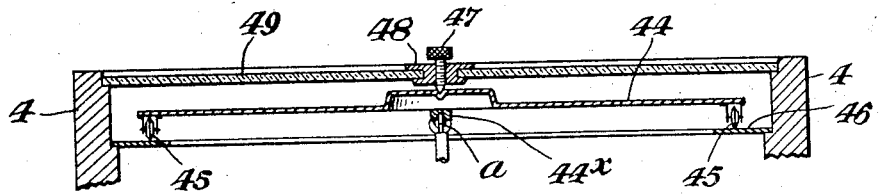
Figure 6 is a transverse section on the line 6—6, Figure 5 showing the dial and mounting.

The dial is centered by means of a threaded stud 47 in a mounting 48 carried by the glass face 49. Fig. 5 shows the zero position of the dial 44, the groove in member 44× on said dial being at this time at right angles to the transverse axis of the instrument. The initial or normal position of the pointer *a* is in the vertical center line of the instrument and in the center of the dial 44. The movements of the pointer *a* parallel with the direction of movement of the pendulum 28 will correspondingly change the dial position so that it will represent the relation between the heeling moment and the angle of heel.

From the above it will be seen that the invention is characterized by a construction which includes a gyroscope pivotally suspended in a framework in such manner that the pivotal axis is arranged transversely to the keel line of the ship. A secondary pivotal mounting of the gyroscope within the suspended structure provides for pivotal movement of the gyroscope structure about an axis also transverse to the keel line of the ship so that as the ship rolls laterally, the precession which is produced in the gyroscope brings about, through a gear train connection, a movement of an upwardly projecting finger in lateral directions transverse to the keel line.

Another feature of the apparatus is the provision of a pendulum device which has pivotal movement about an axis parallel to the keel line. The pendulum is also connected through another gear train to the upwardly projecting finger in such manner as to give movement to the finger in directions parallel to the keel line.

An indicating device is provided which takes the form of a rotary indicator dial having a slot formed diametrically in its under surface and engaged by the upwardly projecting finger so that a rotatable movement of the indicator card is provided which measures the resultant movement produced by the precession of the gyroscope and the swinging movement of the pendulum.

In other words, the resultant or component movement transmitted to the dial or indicator card measures, through suitable calibrations, the metacentric height of the vessel for a given displacement, the metacentric height being a function of the relation between the angle of heel and the heeling moment. The movement of the indicator actuating finger transversely of the vessel, which is brought about by pressure on the trunnions of the casing of the gyroscope, is a measure of the heeling moment while the movement of the finger parallel to the keel, which is brought about by the movement of the pendulum, is a measure of the angle of heel. The component of these two motions produces a result which is the measure or indication desired.

I claim:

1. A device for automatically measuring and indicating, comprising a pendulous ring, a gyroscope including trunnions mounted in said ring, an indicator, a pendulum having a rack and adapted for movement on an axis extending transversely of the gyroscope trunnions, and inter-dependent connections respectively between the gyroscope and the pendulum rack on the one hand and the indicator on the other hand for changing the position of the latter, as and for the purpose set forth.

2. In a device of the character set forth, a pedestal, a ring-frame pivotally supported on the pedestal, a motor driven gyroscope pivotally suspended in the ring-frame as to turn about an axis parallel with the pivot axis of the frame, a movable indicator, gear and pinion connections intermediate the gyroscope and the indicator, a pendulum supported by the ring-frame so as to turn about an axis transverse to the pivot axis of the frame and operative connections intermediate the indicator and the pendulum.

3. In a device of the character set forth, a pedestal, a ring frame pivotally supported on the pedestal, a motor driven gyroscope suspended in the ring frame, a movable indicator, gear and pinion connections intermediate the gyroscoe and the indicator, a pendulum supported by the ring frame and operative connections intermediate the indicator and pendulum, a frame, the operative connections intermediate the gyroscope and the indicator being adapted to move the latter in one direction and the connection intermediate the pendulum and the indicator being adapted to move the indicator in another direction.

4. A device constructed in accordance with claim 3, having means for actuating the indicator comprising a worm sleeve for supporting the indicator, a worm upon which the sleeve is mounted, and a second worm and connections for bodily moving the first named worm and the immediate driving connections for the latter.

5. A device constructed in accordance with claim 3 having means for actuating the indicator comprising a gear carried by the gyroscope, a pinion in mesh with said gear, a worm shaft, a supporting bracket at each end of said shaft, one bracket being formed as a worm sleeve and the other bracket supporting bevelled gears, a worm shaft for said sleeve and a rotatable key-shaft for one of said pinions, a worm sleeve supporting the indicator and on the first named worm shaft, operative connections intermediate the pendulum and the second named worm shaft, and operative connections intermediate the gyroscope gear and pinion and the key-shaft.

6. In an apparatus of the character described, means responsive to the heeling moment of a body, means responsive to the angle of heel, and means jointly controlled by said two first mentioned means for indicating the metacentric height of the body.

7. In an apparatus of the character described, means automatically movable in accordance with the heeling moment of a body, means automatically movable in accordance with the angle of heel and indicating means settable by the joint action of said two first mentioned means.

8. In an apparatus of the character described, a movable element, gyroscopic means for shifting said element in accordance with the heeling moment of a body, means for shifting said element in accordance with the angle of heel, and indicating means controlled by said element for showing the metacentric height of said body.

9. In an apparatus of the character described, means for measuring the angle of roll of a body, gyroscopic means responsive to rolling of said body, and means jointly controlled by the two first-mentioned means for indicating the metacentric height of said body.

10. In an apparatus of the character described, means for indicating the metacentric height of a body, and gyroscopic means for controlling the first-mentioned means.

11. In an apparatus of the character described, an indicator, and means including a gyroscope for causing said indicator to show the metacentric height of a body.

In testimony whereof I have signed my name to this specification.

JOHN LYELL WILSON.